United States Patent
Inokuma et al.

(10) Patent No.: US 6,757,015 B2
(45) Date of Patent: Jun. 29, 2004

(54) IMAGE SENSING APPARATUS

(75) Inventors: Kazuyuki Inokuma, Kyoto (JP); Toshiya Fujii, Shiga (JP); Shinichi Tashiro, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/261,696

(22) Filed: Oct. 2, 2002

(65) Prior Publication Data
US 2003/0067550 A1 Apr. 10, 2003

(30) Foreign Application Priority Data
Oct. 4, 2001 (JP) ........................................ 2001-308396

(51) Int. Cl.[7] ................................................. H04N 3/14
(52) U.S. Cl. ........................ 348/273; 348/272; 348/266; 348/659
(58) Field of Search ................................. 348/272, 273, 348/208.13, 317, 320, 322, 14.12, 294, 298, 659, 277–280

(56) References Cited

U.S. PATENT DOCUMENTS

| | | | | |
|---|---|---|---|---|
| 4,290,671 A | * | 9/1981 | Rhodes et al. | 359/891 |
| 4,616,255 A | * | 10/1986 | Nakagaki et al. | 348/290 |
| 5,170,249 A | * | 12/1992 | Ohtsubo et al. | 348/222.1 |
| 6,249,314 B1 | * | 6/2001 | Yamamoto et al. | 348/242 |
| 6,611,289 B1 | * | 8/2003 | Yu et al. | 348/265 |
| 2001/0010554 A1 | * | 8/2001 | Yoshida | 348/312 |
| 2001/0024237 A1 | * | 9/2001 | Osada et al. | 348/273 |
| 2001/0048477 A1 | * | 12/2001 | Misawa | 348/272 |

FOREIGN PATENT DOCUMENTS

JP     2000-23046     1/2000

* cited by examiner

Primary Examiner—Vu Le
Assistant Examiner—Kelly L. Jerabek
(74) Attorney, Agent, or Firm—McDermott, Will & Perry

(57) ABSTRACT

An image sensing apparatus is provided, in which the charges of four pixels that are adjacent in the horizontal direction and the vertical direction are mixed and output, and combinations of pixel mixings in the horizontal direction are changed at each line, so that signals after four pixels have been mixed are in an offset sampling relation for each line. Furthermore, a color filter of, for example, an RGB primary color stripe arrangement is provided such that three independent color signals can be attained in both a still picture image sensing (all pixel readout) mode and in a moving picture image sensing (four pixel mixing readout) mode.

11 Claims, 18 Drawing Sheets

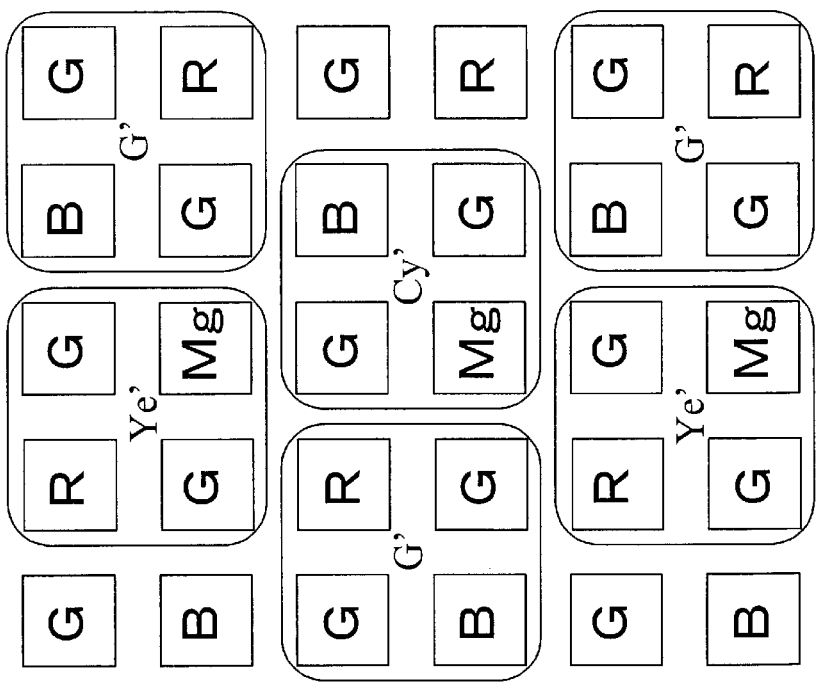
FIG. 16B SECOND FRAME
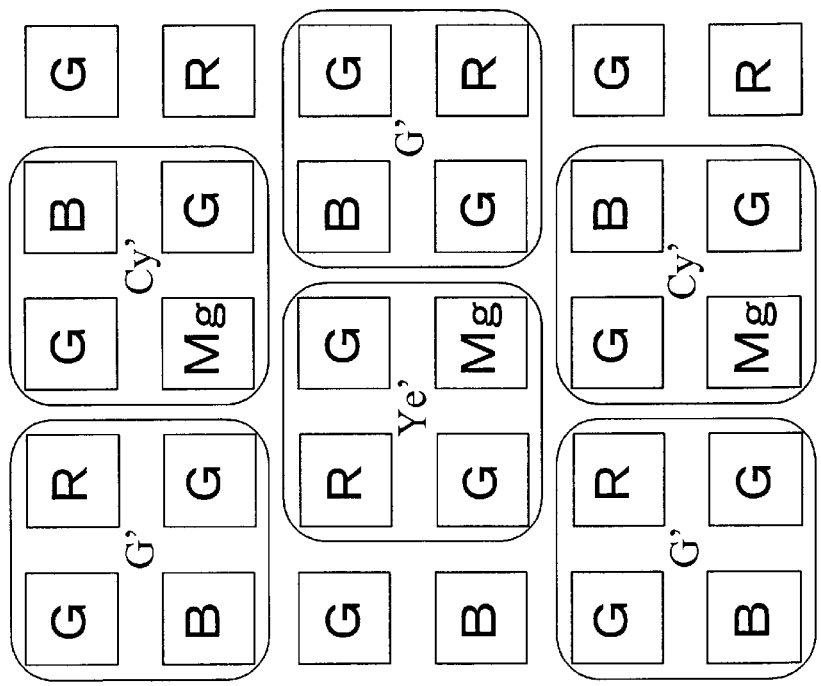
FIG. 16A FIRST FRAME

IMAGE SENSING APPARATUS

BACKGROUND OF THE INVENTION

The present invention relates to image sensing apparatuses having CCD-type image sensing elements.

The commercial spread of digital still cameras (DSC) with CCD sensing elements has been tremendous. Such image sensing elements are configured of a plurality of photoelectric conversion portions, a plurality of vertical transfer portions, a horizontal transfer portion, and a charge detection amplifier. The photoelectric conversion portions are arranged as pixels in the horizontal direction and the vertical direction, and are for the photoelectric conversion of the subject image. The vertical transfer portions are for the vertical transfer of the charges in the pixels. The horizontal transfer portion is for the horizontal transfer of the charges that have been transferred by the vertical transfer portions. The charge detection amplifier converts the charge signal obtained from the horizontal transfer portion into a voltage signal, and outputs it as the image sensing signal. For the vertical transfer portions, there are interlace-type vertical transfer portions provided with two charge holding portions for each photoelectric conversion portion, and progressive-type vertical transfer portions with three or four charge holding portions for each photoelectric conversion portion.

In DSCs of recent years, there is a demand for providing moving pictures with higher definition than conventional TV pictures at low cost, in addition to high-definition still images. Furthermore, there is a need for the display of high-definition moving pictures not only on TV sets but also on display devices of personal computers.

In DSCs using a CCD image sensing element with 1,300,000 pixels for example, the effective pixel number is 1280 horizontal pixels and 960 vertical pixels, and when so-called interlaced readout is performed, moving pictures with a picture quality that is close to Hi-Vision can be attained.

However, in this case, the driving frequency of the horizontal transfer portion is as high as about 50 MHz. Driving the horizontal transfer portion at such high speeds increases the power consumption, leads to a high degree of technical difficulty with small margins for performance guarantee, and necessitates adjustments or the like, so that the costs become extremely high.

SUMMARY OF THE INVENTION

It is an object of the present invention to provide an image sensing apparatus with which the driving frequency of the horizontal transfer portion can be reduced, while obtaining high-definition moving pictures.

To attain this object, in the present invention, the charges of four pixels of the image sensing element that are adjacent in the horizontal direction and the vertical direction are mixed and output.

More specifically, a first image sensing apparatus in accordance with the present invention includes an image sensing element having a plurality of photoelectric conversion portions for photoelectric conversion of a subject image, the photoelectric conversion portions being arranged as pixels in horizontal direction and vertical direction, and a mixing means for mixing and outputting charges of four pixels of the image sensing element that are adjacent in the horizontal direction and the vertical direction, wherein combinations of the pixel mixings in the horizontal direction are changed at each line, so that the signals after the four pixels have been mixed are in an offset sampling relation for each line. With this configuration, the horizontal driving frequency during the image sensing of moving pictures can be set to ½ of the case that pixel mixing in the horizontal direction is not performed. Moreover, by employing offset sampling, it is possible to prevent deterioration of the horizontal resolution. Furthermore, if the combination of pixel mixings in the vertical direction is changed for each field, then it is possible to adapt to Hi-Vision interlaced scans.

A second image sensing apparatus in accordance with the present invention includes an image sensing element having a plurality of photoelectric conversion portions for photoelectric conversion of a subject image, the photoelectric conversion portions being arranged as pixels in horizontal direction and vertical direction, a mixing means for mixing and outputting charges of four pixels of the image sensing element that are adjacent in the horizontal direction and the vertical direction, and a control means for selecting and controlling an operation mode in which signals of all pixels are output independently without performing the four-pixel mixing, and an operation mode in which signals after the four pixels have been mixed are output, wherein the image sensing element is provided with a color filter arrangement with which in both operation modes at least three independent color signals are obtained. Thus, in addition to still pictures that are equivalent to the prior art, it is possible to obtain high-definition moving pictures.

A third image sensing apparatus in accordance with the present invention includes an image sensing element having a plurality of photoelectric conversion portions for photoelectric conversion of a subject image, the photoelectric conversion portions being arranged as pixels in horizontal direction and vertical direction, a mixing means for mixing and outputting charges of four pixels of the image sensing element that are adjacent in the horizontal direction and the vertical direction, a control means for changing for each frame the combination of pixel mixings in the horizontal direction in the four-pixel mixing, and a pixel synthesis portion for synthesizing an image of two frames with different combinations of pixel mixings in the horizontal direction. Thus, the image quality of moving pictures can be improved even more than with the second image sensing apparatus.

BRIEF DESCRIPTION OF THE DRAWINGS

FIGS. 16A and 16B illustrate how the combinations of the four-pixel mixings are changed at each frame, taking the modified Bayer pattern filter arrangement of FIG. 15 as an example. FIG. 16A illustrates a first frame, and FIG. 16B illustrates a second frame.

DETAILED DESCRIPTION OF THE INVENTION

The following is a detailed description of embodiments of the present invention with reference to the accompanying drawings.

Figure 1:
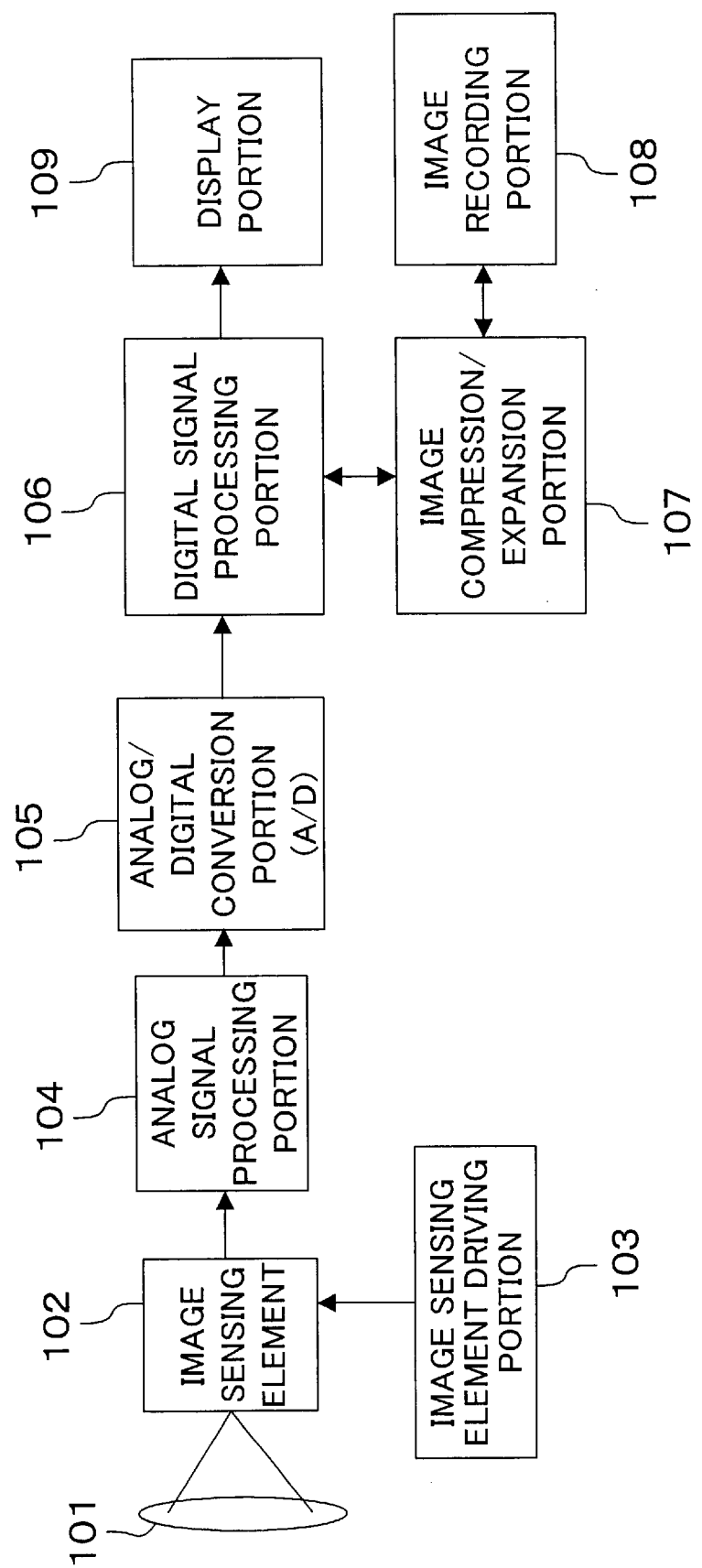
FIG. 1 shows the overall configuration of an image sensing apparatus in accordance with an embodiment of the present invention.

FIG. 1 shows the overall configuration of an image sensing apparatus (DSC) in accordance with an embodiment of the present invention. This DSC includes a lens 101, a CCD-type image sensing element 102, an image sensing element driving portion 103, an analog signal processing portion 104, an analog/digital conversion portion (A/D) 105, a digital signal processing portion 106, an image compression/expansion portion 107, an image recording portion 108, and a display portion 109.

With the DSC shown in FIG. 1, the subject image that has passed through the lens 101 is imaged onto the image sensing element 102. The image sensing element 102 is driven by the image sensing element driving portion 103 so as to perform photoelectric conversion, and outputs an image sensing signal. Next, the analog signal processing portion 104 performs processes such as noise elimination and amplification, and the analog/digital conversion portion 105 converts the image sensing signal into a digital signal. The digital signal processing portion 106 receives the digitized image sensing signal, and generates a picture signal including a luminance signal and a chrominance signal. The display portion 109 receives this picture signal and displays the image. Parallel to the image display, the image compression/expansion portion 107 compresses the image information obtained from the digital signal processing portion 106, and the image recording portion 108 records the compressed image information. The image information recorded by the image recording portion 108 also can be expanded by the image compression/expansion portion 107 and the image can be reproduced by the display portion 109 via the digital signal processing portion 106.

As mentioned above, the vertical transfer portions of the image sensing element 102 can be interlace-type vertical transfer portions or progressive-type vertical transfer portions. In progressive-type vertical transfer portions, the entire charges of the photoelectric conversion portions can be transferred at once, whereas in interlaced-type vertical transfer portions, the charges of the even-numbered lines and the odd-numbered lines are transferred separately. Therefore, charges are read out at different timings with the interlaced type, and there is the problem that when light continues to be incident on the photoelectric conversion portions until the readout time, then the exposure time shifts, and moving subjects may blur. To address this problem, a shutter is necessary in order to block the light before the readout. However, interlaced-type image sensing elements are often used in DSCs, because they can be fabricated at low cost.

Figure 2:
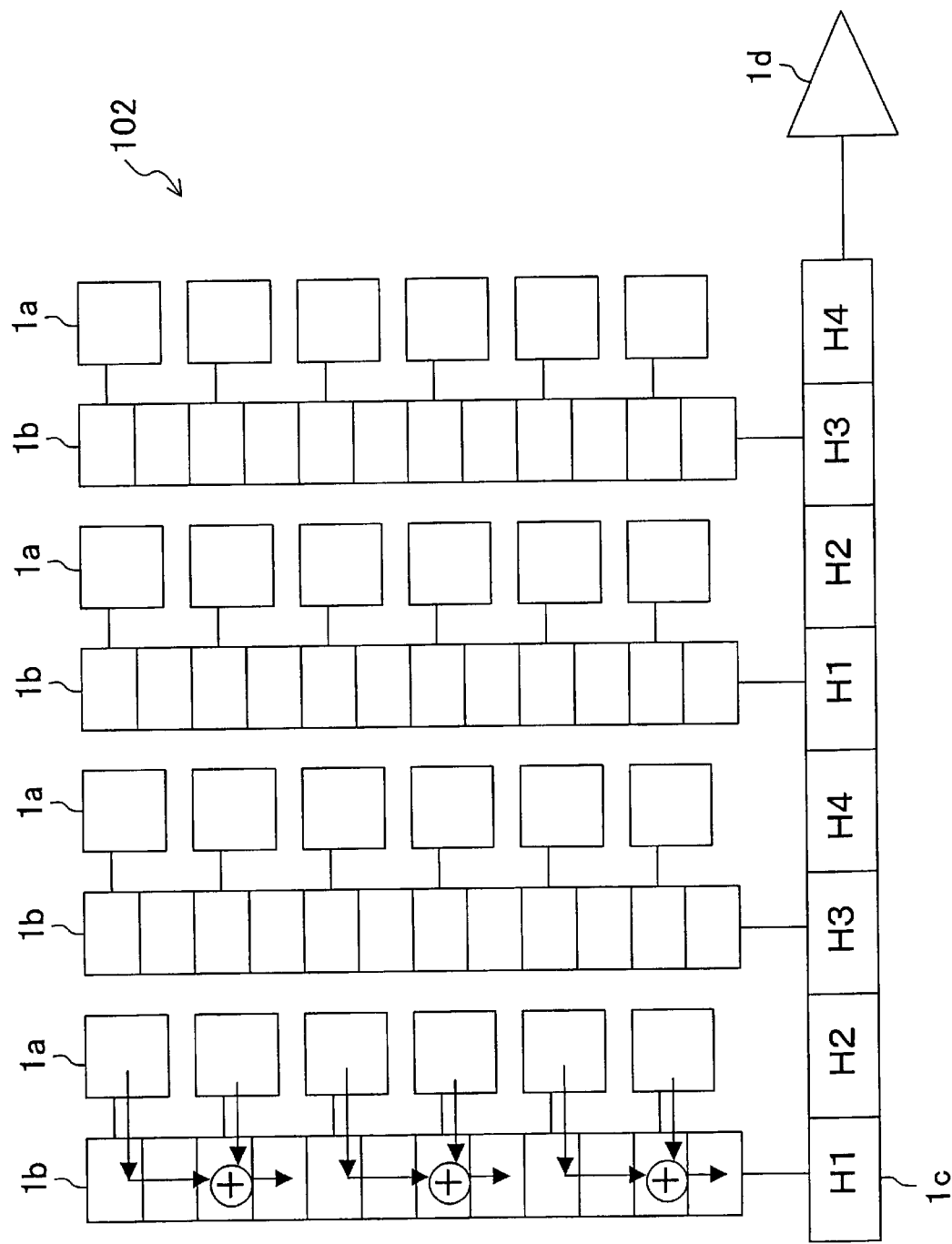
FIG. 2 shows an (interlaced type) example of the CCD sensing element in FIG. 1, and the operation of this image sensing element in the first field of the moving picture image sensing mode.
Figure 3:
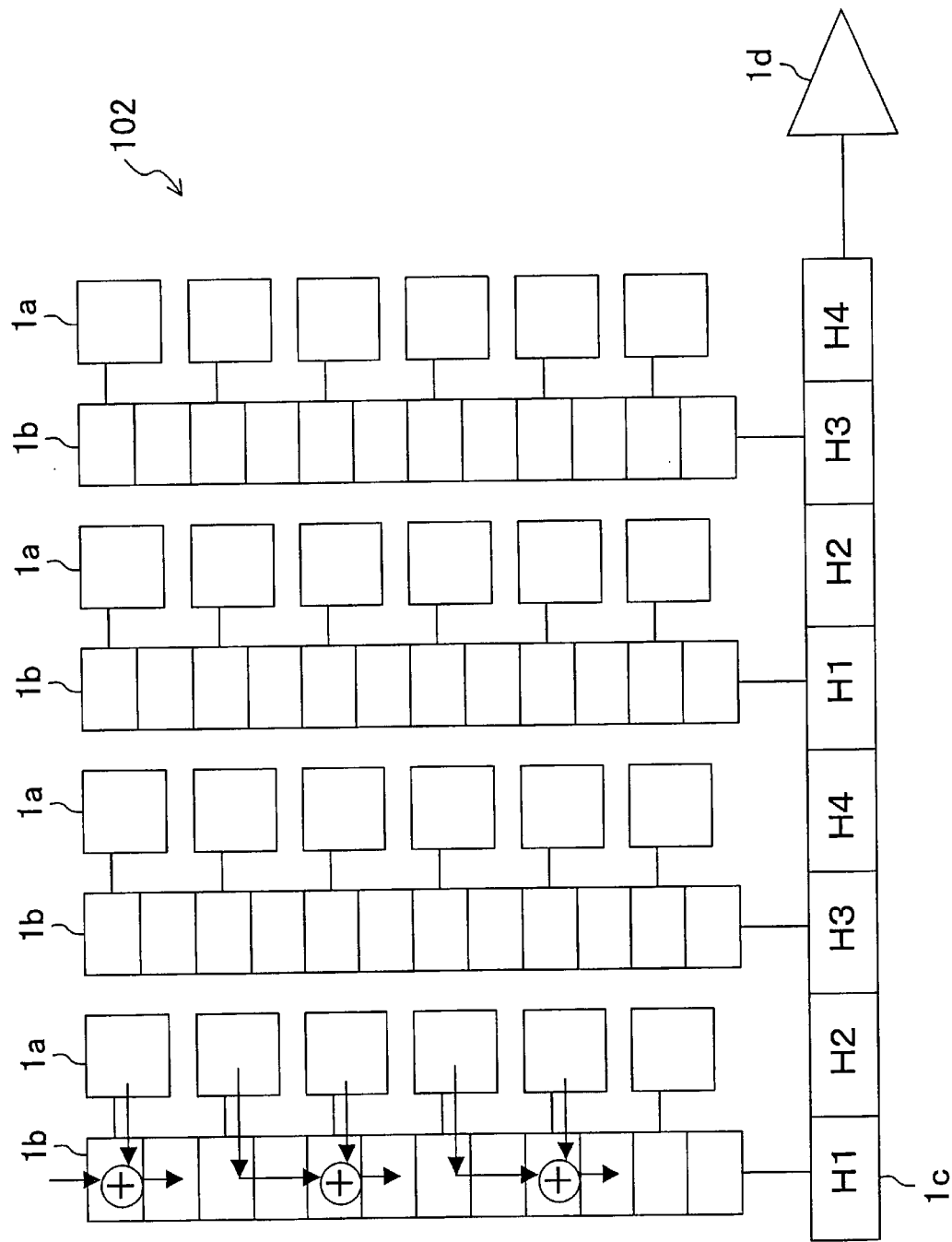
FIG. 3 illustrates the operation of the (interlaced type) image sensing element in the second field of the moving picture image sensing mode.

FIGS. 2 and 3 show an interlaced-type image sensing element 102. Numeral 1a denotes photoelectric conversion portions, numeral 1b denotes two-phase driven vertical transfer portions, numeral 1c denotes a four-phase driven horizontal transfer portion, and numeral 1d denotes a charge detection amplifier. It should be noted that for simplification, only a reduced number of pixels is shown in the figures.

Figure 4:
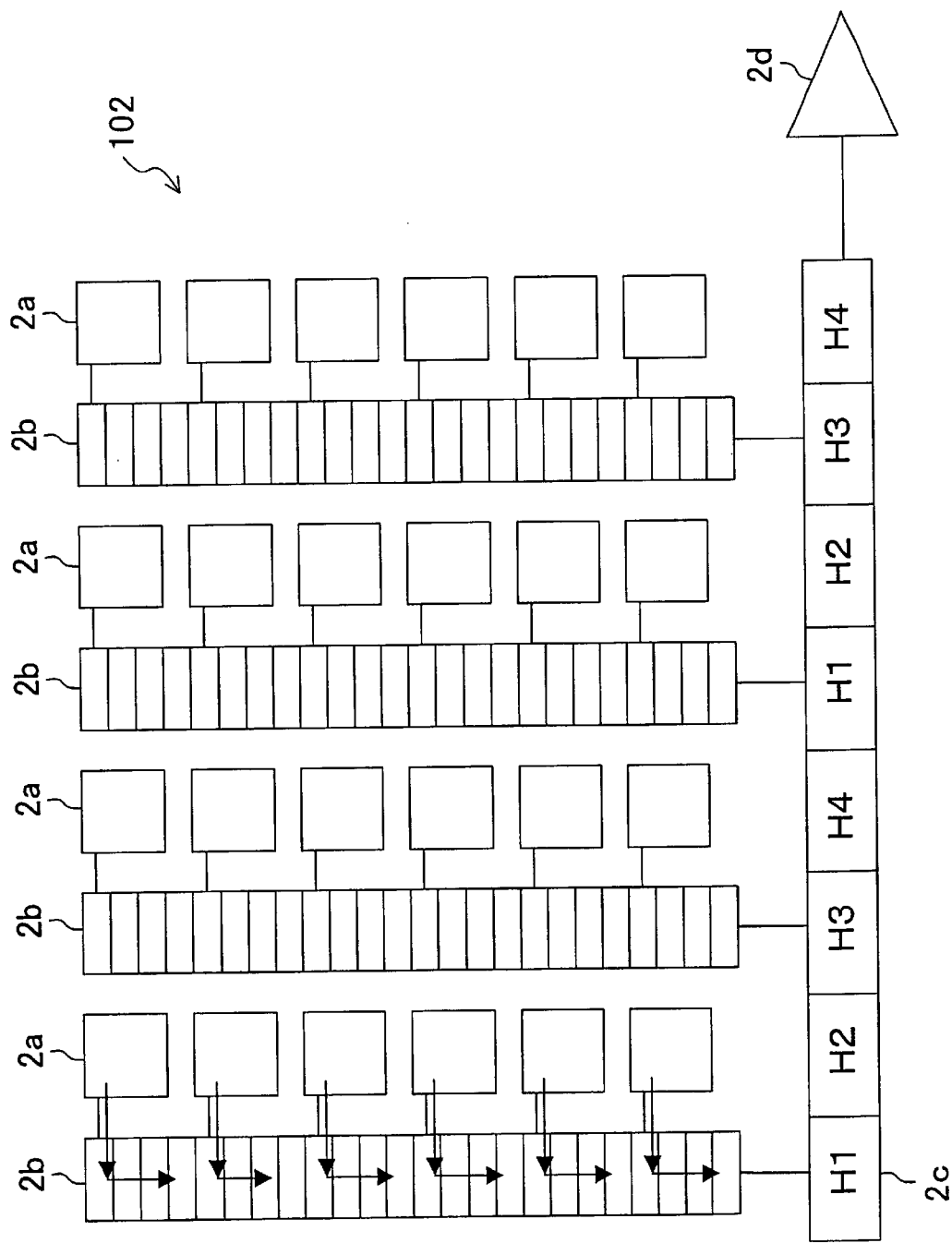
FIG. 4 is a diagram showing another (progressive type) example of the image sensing element in FIG. 1.

FIG. 4 shows a progressive-type image sensing element 102. Numeral 2a denotes photoelectric conversion portions, numeral 2b denotes four-phase driven vertical transfer portions, numeral 2c denotes a four-phase driven horizontal transfer portion, and numeral 2d denotes a charge detection amplifier. Also here, only a reduced number of pixels is shown in the figure for simplification.

Figure 5:
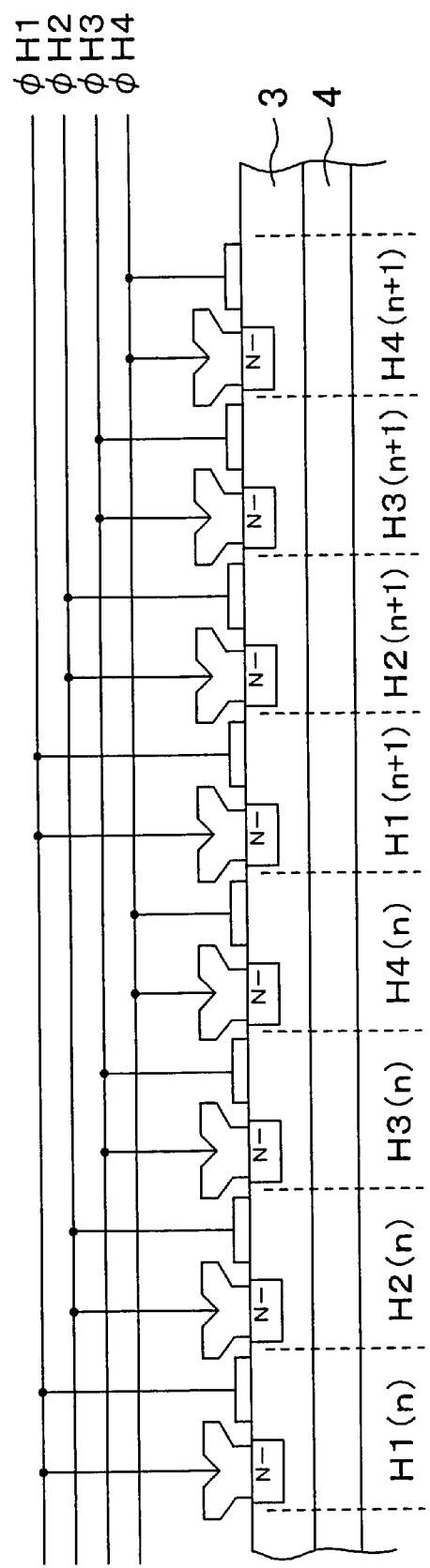
FIG. 5 is a cross-sectional view showing an example of the structure of the horizontal transfer portion in FIGS. 2 to 4.

FIG. 5 illustrates a structural example of the horizontal transfer portions 1c and 2c in FIGS. 2 to 4. In FIG. 5, numeral 3 denotes an N-type diffusion region, numeral 4 denotes a P-type well, and H1($n$) to H4($n$) denotes 4-phase gates, and H1(n+1) to H4(n+1) denote adjacent 4-phase gates. φH1 to φH4 denote 4-phase driving pulses. Here, n is an arbitrary integer.

The following is an explanation of the operation of the still picture image sensing mode and the moving picture image sensing mode of the DSC in FIG. 1.

Still Picture Image Sensing Mode

The still picture image sensing mode is an "all pixel readout" mode, in which the signals of all pixels are read out independently.

In the case of the interlaced image sensing element 102 shown in FIGS. 2 and 3, when the charges of all pixels are transferred simultaneously to the vertical transfer portions 1b, they are invariably mixed up, and thus cannot be transferred independently. Consequently, the charges of the even-numbered lines and the charges of the odd-numbered lines are transferred at separate timings. But if the charges are simply transferred at different timings, then the exposure time for even-numbered lines and that for odd-numbered lines will be different, so that a shutter for blocking light is provided, and the exposure times are equalized by performing the transfer after the light has been blocked.

More specifically, first the shutter is closed, and after the photoelectric conversion with the photoelectric conversion portions 1a has been stopped, the signal charges of the photoelectric conversion portions 1a in the odd-numbered lines are transferred to the vertical transfer portions 1b. Then, the signal charges are transferred in vertical direction with the vertical transfer portions 1b, and transferred all the way to the horizontal transfer portion 1c. Next, the horizontal transfer portion 1c transports the signal charges in the horizontal direction, and, after having passed through the charge detection amplifier 1d, an image sensing signal is output. After the transfer of the odd lines has been finished, the signal charges of the even lines are transferred to the vertical transfer portions 1b, the signal charges are transferred in the same manner as for the odd lines, and an image sensing signal is output.

In the case of the progressive-type image sensing element 102 shown in FIG. 4, the signal charges are transferred independently for each pixel with the vertical transfer portions 2b, so that the problem of charge mixing during the transfer does not exist. The horizontal transfer portion 2c transfers the signal charges in horizontal direction, and, after having passed through the charge detection amplifier 2d, an image sensing signal is output.

Figure 6:
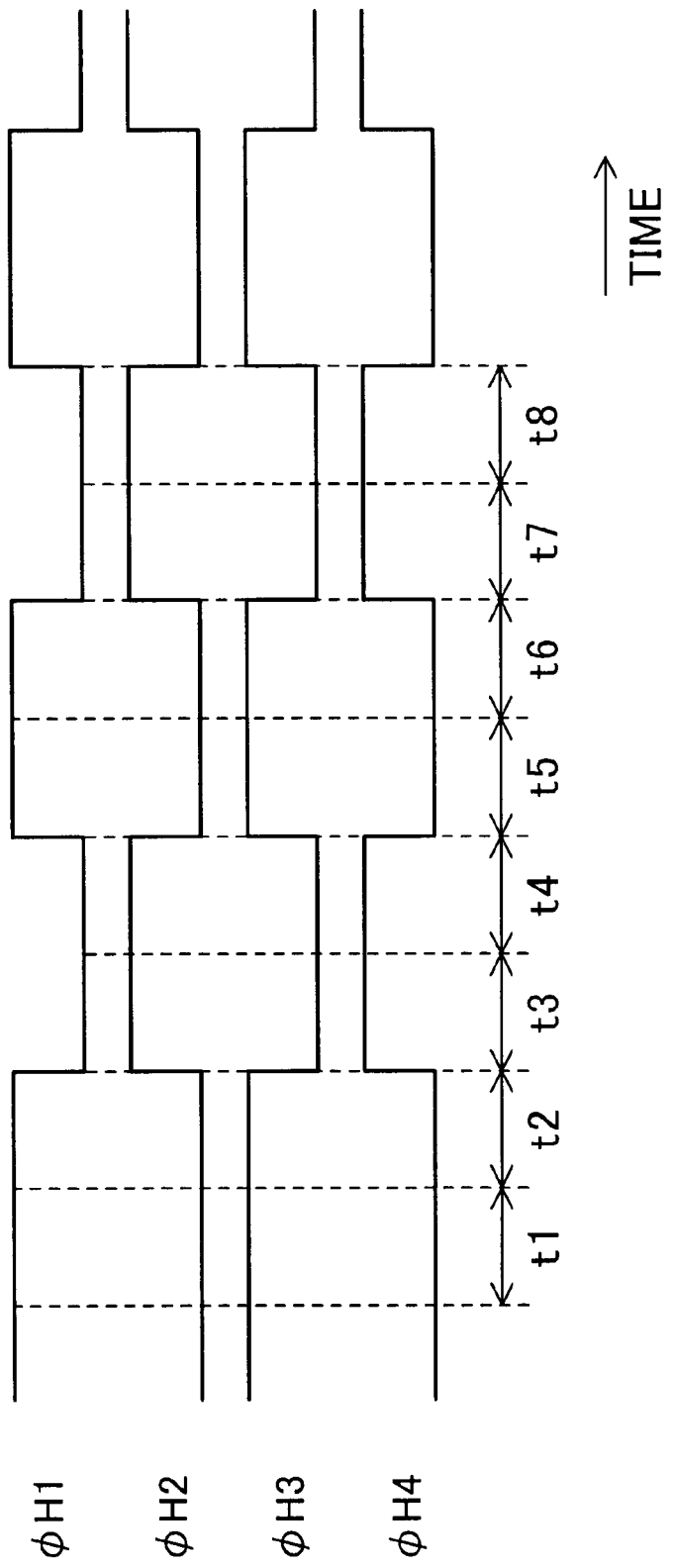
FIG. 6 is a waveform diagram of the driving pulses in FIG. 5 in the still picture image sensing mode.
Figure 7:
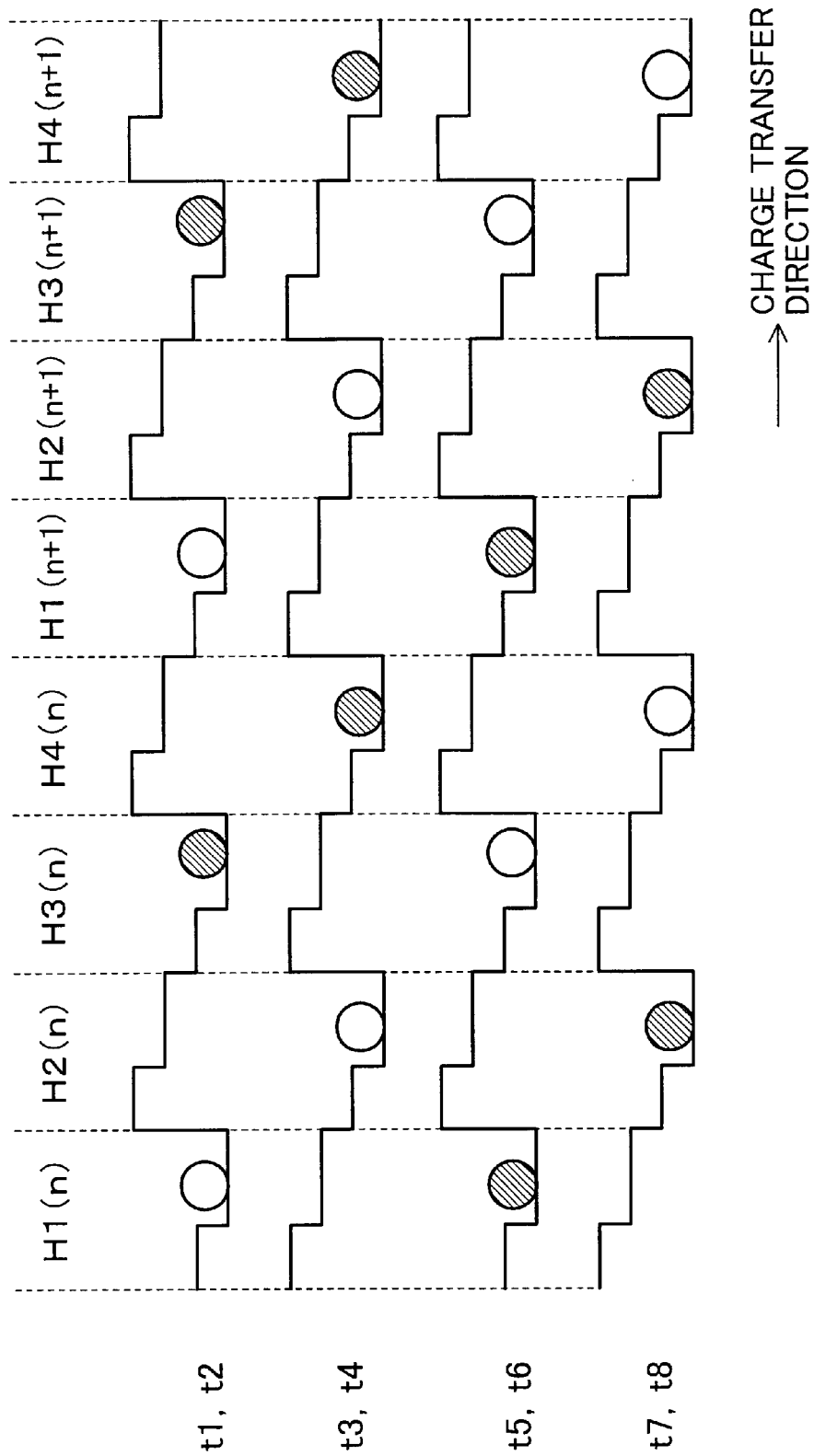
FIG. 7 illustrates how charges are transferred (without pixel mixing) in the horizontal transfer direction in FIG. 5, if the driving pulses in FIG. 6 are applied.

FIG. 6 shows the waveforms of the driving pulses φH1 to φH4 in FIG. 5 during the still picture image sensing mode, and FIG. 7 shows how the charges are transferred in the horizontal direction (without pixel mixing) in that mode. t1 to t8 represent periods having a predetermined length. FIG. 7 shows the change of the potential, and charges are held at the lowest levels. The circles represent the charges.

According to FIG. 7, in the periods t1 and t2, charges are held by the gates H1(n), H3(n), H1(n+1) and H3(n+1). In the periods t3 and t4, the charge of H1(n) is passed to H2(n), the charge of H3(n) is passed to H4(n), the charge of H1(n+1) is passed to H2(n+1), and the charge of H3(n) is passed to H4(n+1). Also thereafter, the charges are transferred without pixel mixing. It should be noted that in the still picture image sensing mode, the horizontal charge transfer may be carried out at a speed that is lower than in the moving picture image sensing mode.

Moving Picture Image Sensing Mode

The moving picture image sensing mode is a "four-pixel mixing readout" mode, in which the charges of four pixels of the image sensing element 102 that are adjacent in the vertical direction and the horizontal direction are mixed, and the resulting image sensing signal is output.

In the case of the interlaced image sensing element 102 shown in FIGS. 2 and 3, first the signal charges of the photoelectric conversion portions 1a are transferred to the vertical transfer portions 1b. Next, the vertical transfer portions 1b perform two-pixel mixing in the vertical direction by mixing the signal charges of two adjacent pixels during the vertical transfer, and transfers the charges all the way to the horizontal transfer portion 1c. Next, the horizontal transfer portion 1c performs two-pixel mixing in the horizontal direction by mixing the signal charges of two adjacent pixels during the horizontal transfer, and transfers the charges all the way to the charge detection amplifier 1d. In this manner, four-pixel mixing in the horizontal direction and the vertical direction is performed as a result, and, after having passed through the charge detection amplifier 1d, the image sensing after the four-pixel mixing is output.

FIG. 2 shows the operation in a first field, and FIG. 3 shows the operation in a second field. That is to say, an interlaced image is obtained by changing for each field the combinations by which pixels are mixed in the vertical direction in the vertical transfer portions 1b.

In the case of the progressive-type image sensing element 102 shown in FIG. 4, first all signal charges of the photoelectric conversion portions 2a are transferred simultaneously to the vertical transfer portions 2b. Then, the signal charges are transferred in the vertical direction by the vertical transfer portions 2b, but different from the case of the interlaced type, they can be transferred independently without pixel mixing. Next, when the signal charges are transferred from the vertical transfer portions 2b to the horizontal transfer portion 2c, the signal charges are transferred twice in succession from the vertical transfer portions 2b to the horizontal transfer portion 2c before the horizontal transfer portion 2c starts the horizontal transfer. Thus, the signal charges of two pixels that are adjacent in the vertical direction are mixed, and as a result, two-pixel mixing in vertical direction is achieved. Next, during the horizontal transfer, the horizontal transfer portion 2c performs two-pixel mixing in the horizontal direction by mixing the signal charges of two adjacent pixels, and transfers the charges all the way to the charge detection amplifier 2d. Thus, as a result, four-pixel mixing in the horizontal direction and the vertical direction is performed, and, after having passed through the charge detection amplifier 2d, the image sensing signal after the four pixels have been mixed is output.

Figure 8:
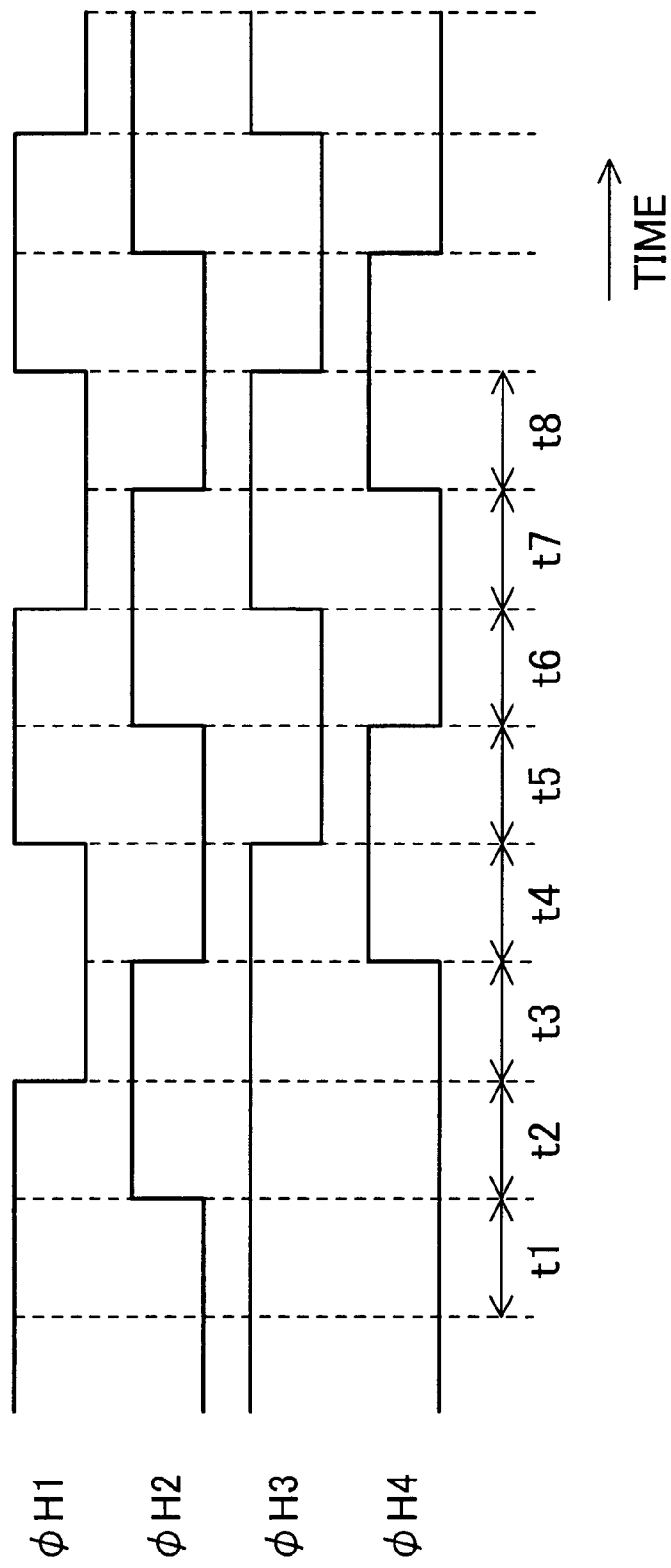
FIG. 8 is a waveform diagram of the driving pulses in FIG. 5 in the moving picture image sensing mode.
Figure 9:
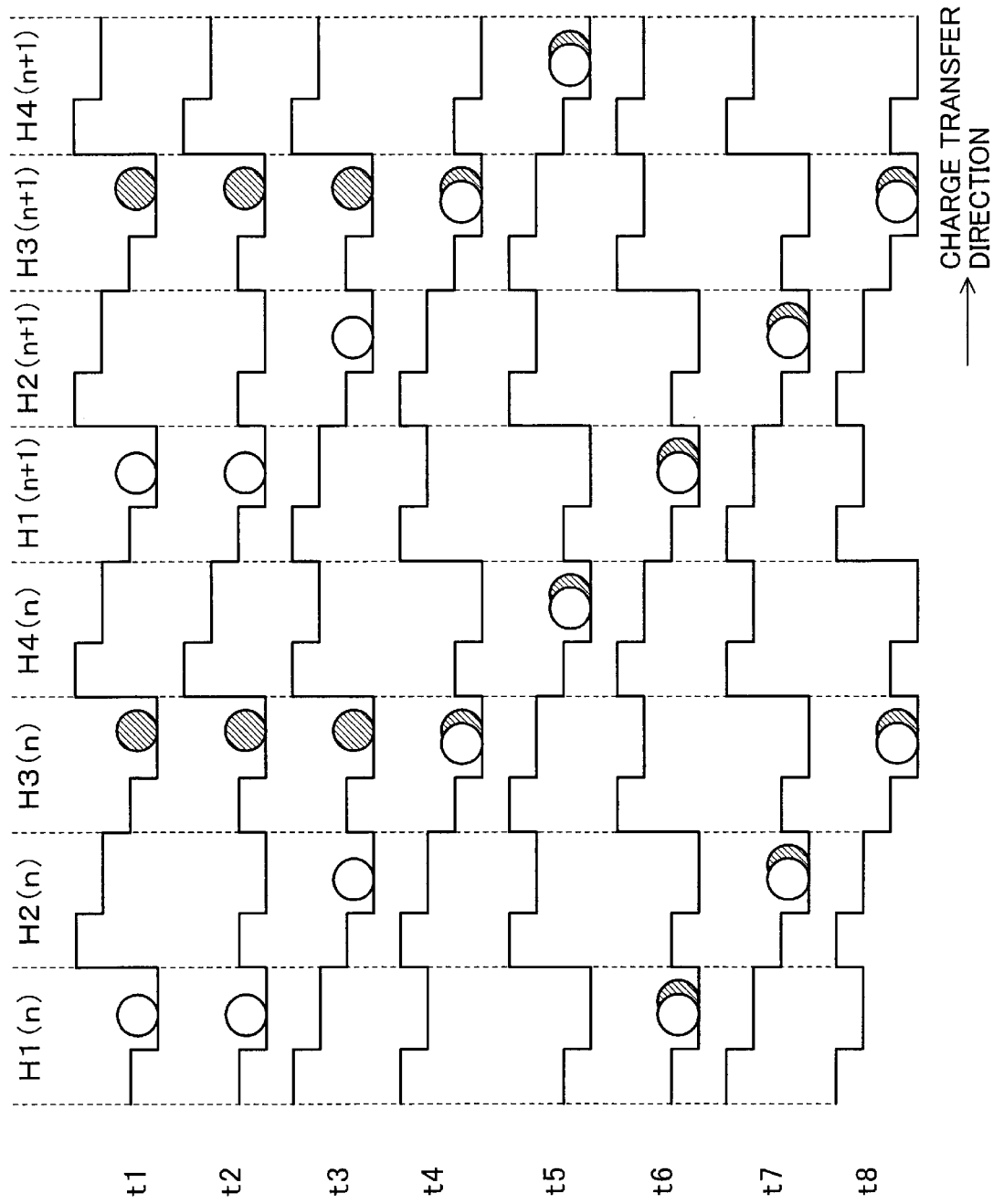
FIG. 9 illustrates how charges are transferred (with pixel mixing) in the horizontal transfer direction in FIG. 5, if the driving pulses in FIG. 8 are applied.

FIG. 8 shows the waveforms of the driving pulses φH1 to φH4 in FIG. 5 in the moving picture image sensing mode, and FIG. 9 shows how the charges are transferred in the horizontal direction (with pixel mixing) in that mode. FIGS. 8 and 9 are common to both the interlaced type (FIGS. 2 and 3) and the progressive type (FIG. 4), and next, the horizontal transfer portion 1c of the former is explained in detail. It should be noted that the two-pixel mixing in the vertical direction is well known in the art, and thus detailed explanations thereof have been omitted.

In accordance with FIGS. 8 and 9, the period t1 indicates the state immediately after the charges have been transferred from the vertical transfer portions 1b to the horizontal transfer portion 1c. In this period t1, the driving pulses φH1 and φH3 are at a high level, and the potential of the gates H1(n), H3(n), H1(n+1) and H3(n+1) becomes low, so that as a result, charges are held at these gates. At the period t2, φH1, φH2 and φH3 become high, and the potential of H2(n) and H2(n+1) becomes low. At the period t3, the potential of H1(n) and H1(n+1) becomes high, the charge at H1(n) is transferred to H2(n), and the charge at H1(n+1) is transferred to H2(n+1). At the period t4, the potential of H2(n) and H2(n+1) becomes high, the charge of H2(n) is transferred to H3(n), and the charge of H2(n+1) is transferred to H3(n+1). Thus, the charge that was originally held in H3(n) and the charge that is transferred to H3(n) are mixed, and also the charge that was originally held in H3(n+1) and the charge that is transferred to H3(n+1) are mixed. That is to say, the charges that were originally held at H1(n) and H3(n) are mixed, and also the charges that were originally held at H1(n+1) and H3(n+1) are mixed. Furthermore, the potential at H4(n) and H4(n+1) becomes low. At the period t5, the potential of H3(n) and H3(n+1) becomes high, and the mixed charge of H3(n) is transferred to H4(n), whereas the mixed charge of H3(n+1) is transferred to H4(n+1). In the following, the mixed charges are transferred in this manner. As can be seen when looking at the frequencies of the four-phase driving pulses φH1 to φH4 in FIG. 8, a horizontal charge transfer speed that is equivalent to the prior art can be achieved with half the conventional driving frequency.

Figure 10:
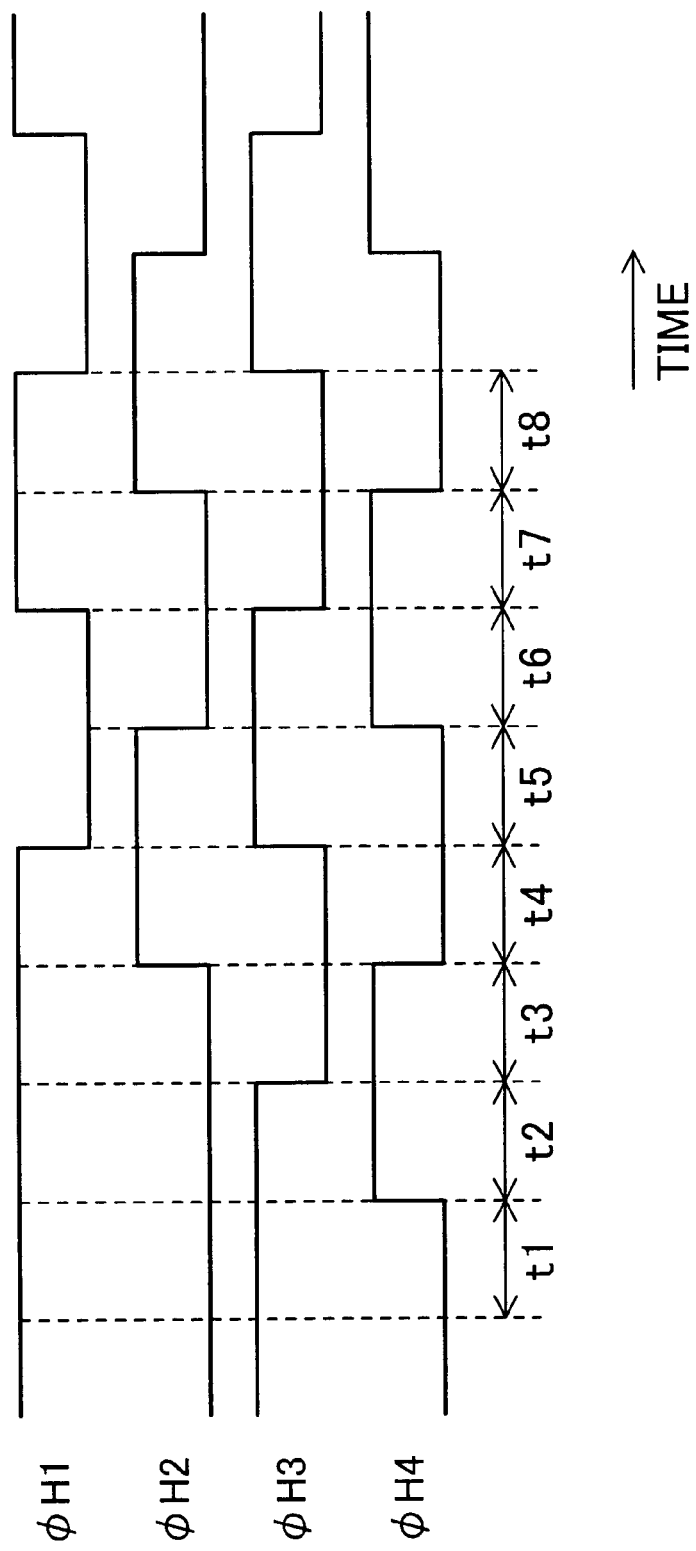
FIG. 10 is another waveform diagram of the driving pulses in FIG. 5 in the moving picture image sensing mode.
Figure 11:
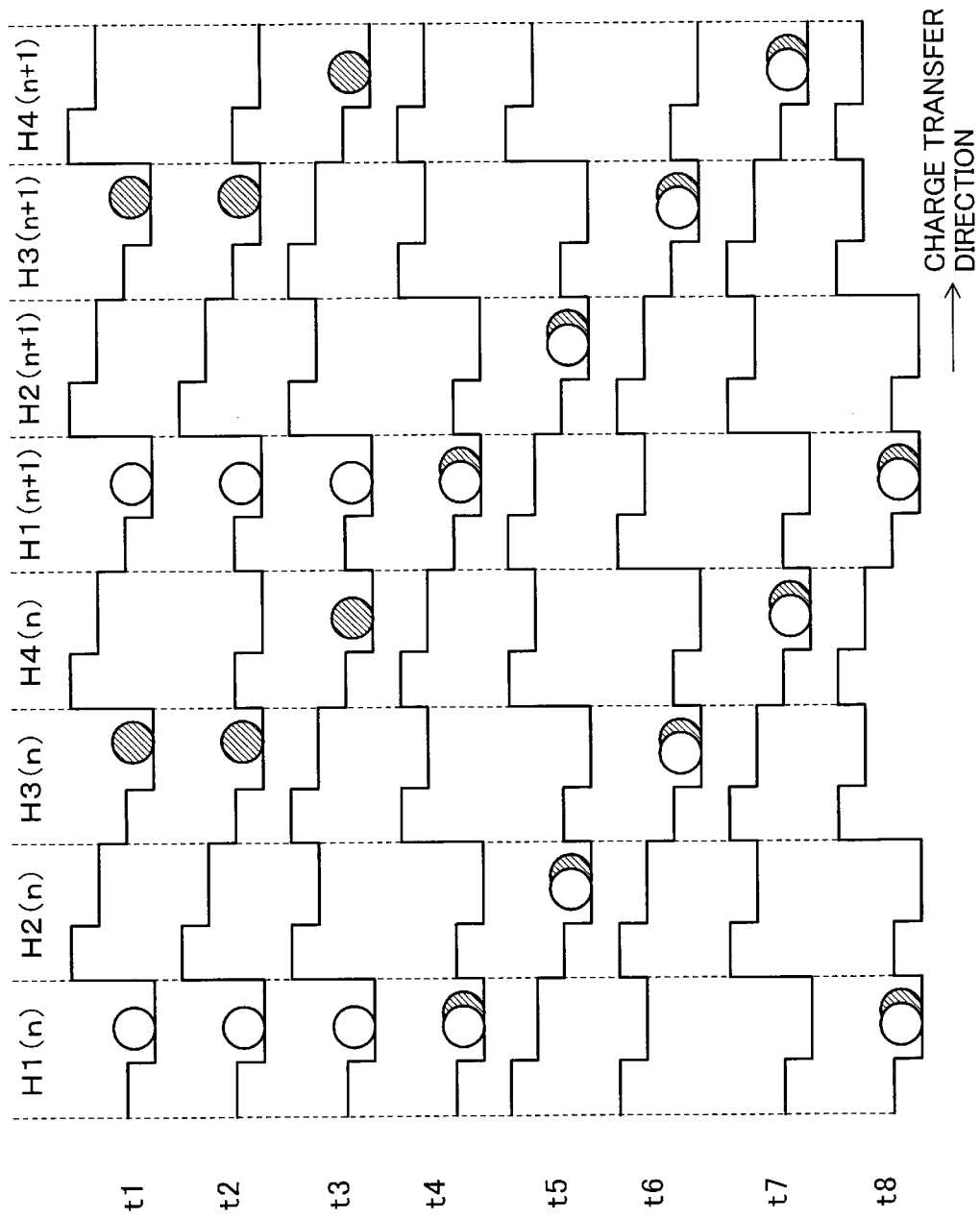
FIG. 11 illustrates how charges are transferred (with pixel mixing) in the horizontal transfer direction in FIG. 5, if the driving pulses in FIG. 10 are applied.

As described above, in accordance with FIGS. 8 and 9, the charge at H1(n) is mixed with the charge at H3(n). On the other hand, FIGS. 10 and 11 illustrate the mixture of the charge at H3(n) and the charge at H1(n+1). That is to say, by changing the waveform of the driving pulses φH1 to φH4 from FIG. 8 to FIG. 10, the combination by which pixels are mixed in the horizontal direction can be changed.

Figure 12:
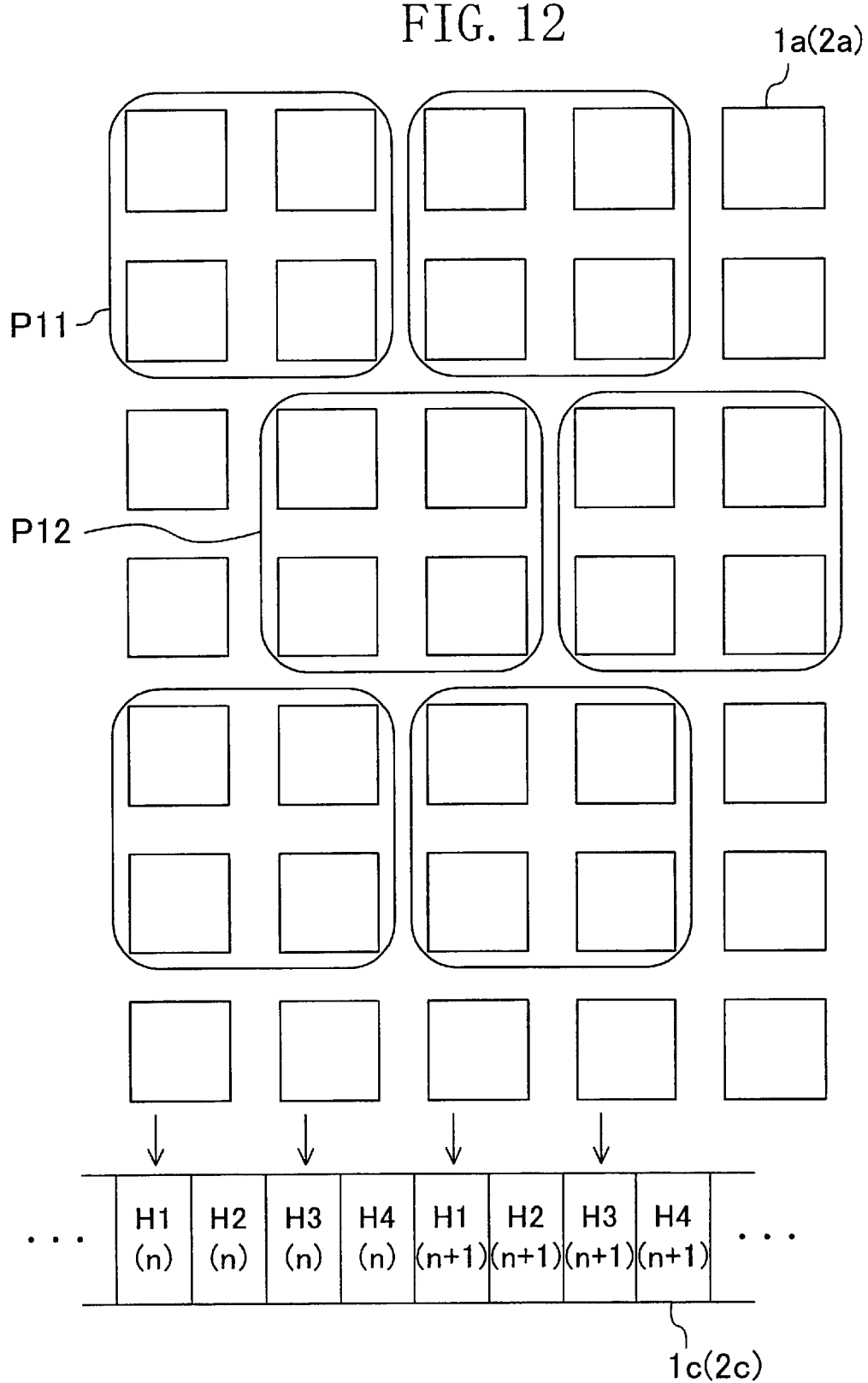
FIG. 12 shows how four pixels are mixed for a first field in the moving picture image sensing mode in the CCD image sensing element in FIG. 1.
Figure 13:
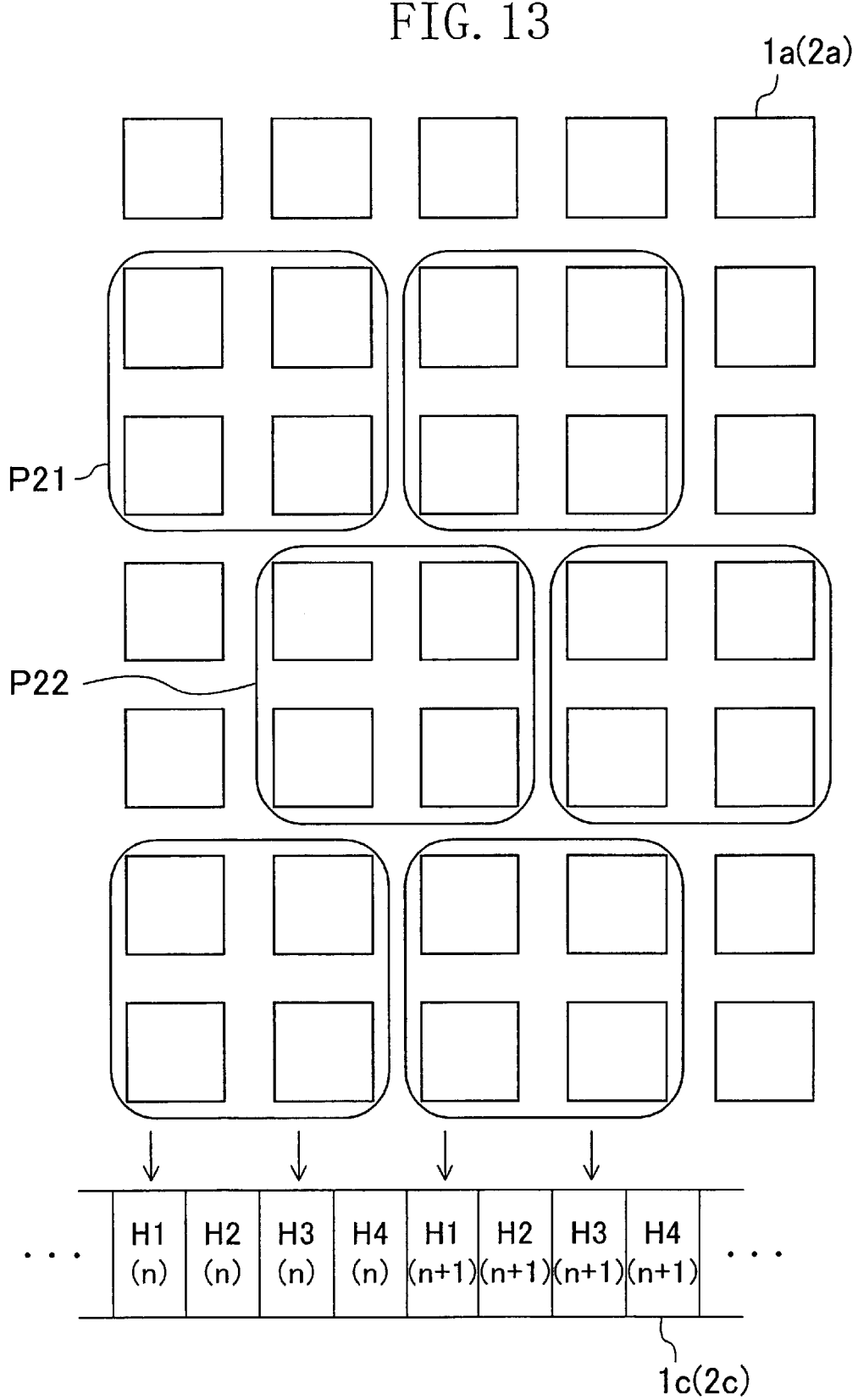
FIG. 13 shows how four pixels are mixed for a second field in the moving picture image sensing mode in the CCD image sensing element in FIG. 1.

Using FIGS. 12 and 13, the following is an explanation of a technique for changing the combination by which pixels are mixed in the horizontal direction such that the signals after four pixels have been mixed are in an offset sampling relation for each line.

FIG. 12 shows how four pixels are mixed in a first field in the moving picture image sensing mode. It should be noted that the depiction of the vertical transfer portions 1b (2b) has been omitted from in FIG. 12. In accordance with FIG. 12, horizontal pixel mixing of H1(n) and H3(n) as in FIGS. 8 and 9 is performed for the line indicated by P11, whereas horizontal pixel mixing of H3(n) and H1(n+1) as in FIGS. 10 and 11 is performed for the next line indicated by P12. Thus, the signals after four pixels have been mixed are in an offset sampling relation for each line, so that the deterioration of the horizontal resolution caused by horizontal two-pixel mixing can be suppressed.

FIG. 13 shows how four pixels are mixed in a second field in the moving picture image sensing mode. Also in this field, there is offset sampling for each line. Moreover, since in adaptation to the interlaced mode, the combinations of the pixel mixings in the vertical direction are changed for each field, as can be seen by comparing P11 and P12 in FIG. 12 to P21 and P22 in FIG. 13.

In order to obtain a color image, color signals of the three primary colors or at least three independent colors based thereon are necessary. Consequently, it is necessary to provide the image sensing element 102 in FIG. 1 with a color filter arrangement with which at least three independent color signals are attained in both the still picture image sensing mode (all pixels readout mode) and the moving picture image sensing mode (four-pixel mixing readout mode). Therefore, at least two kinds of color filters are provided within the areas of four pixels.

Figure 14:
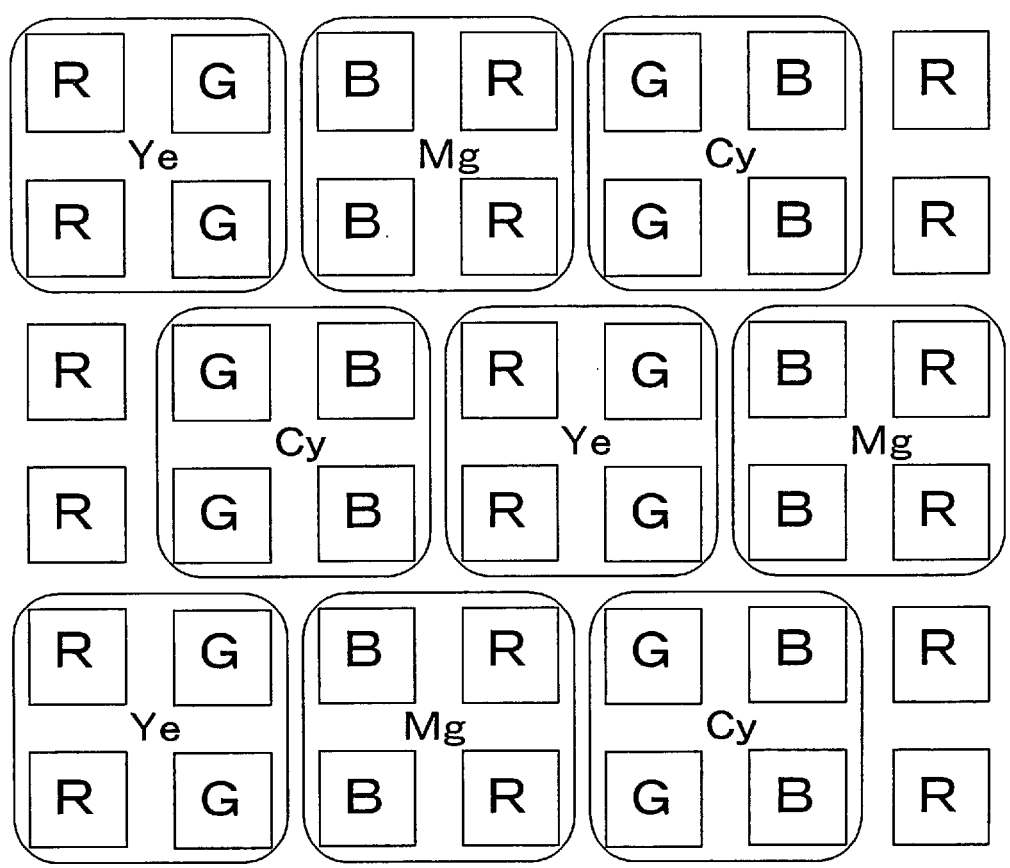
FIG. 14 shows an example (RGB primary color stripe arrangement) of a color filter arrangement that is suitable for the CCD image sensing element in FIG. 1.

FIG. 14 shows an RGB primary color stripe arrangement that is suitable for the image sensing element 102 in FIG. 1. With the color filter arrangement in FIG. 14, the signals after the four pixels have been mixed are turned into the complementary color signals Ye (=R+G), Mg (=B+R) and Cy (G+B). However, when reading out all pixels independently, pixels of the same color are arranged at only every three pixels in the horizontal direction, which is disadvantageous for the horizontal resolution.

Figure 15:
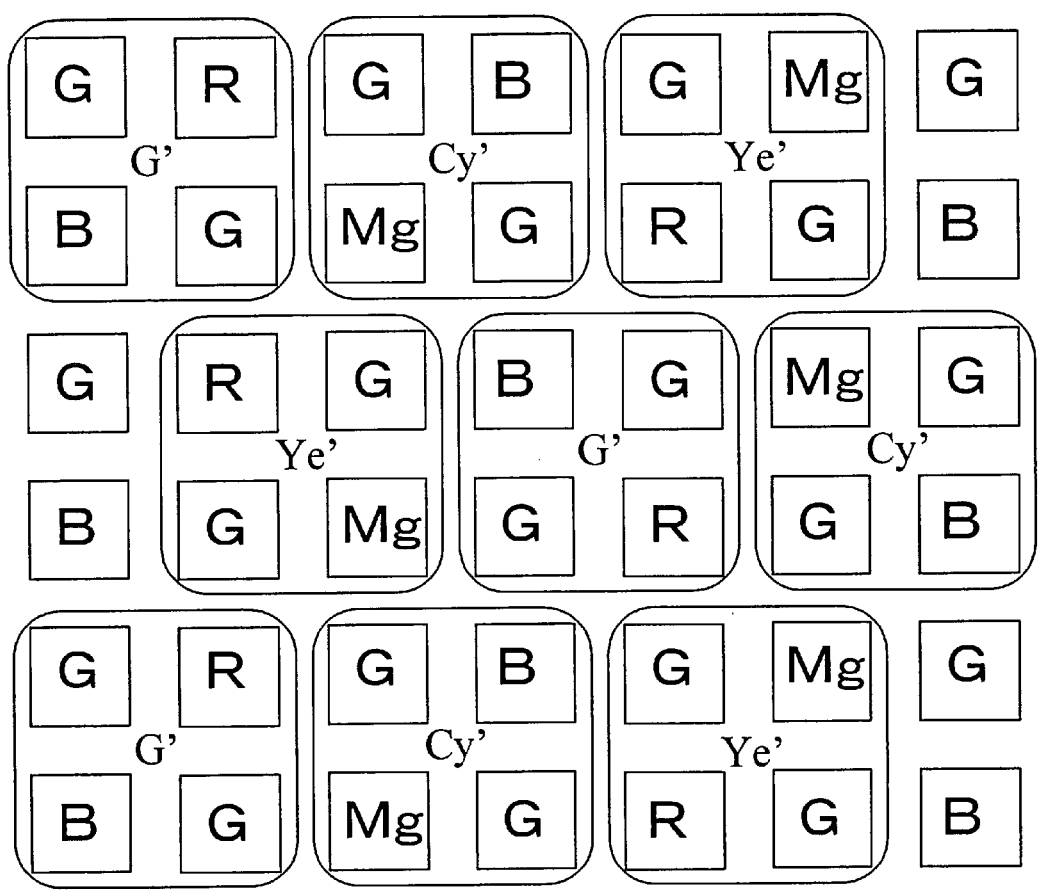
FIG. 15 shows another example (modified Bayer pattern filter arrangement) of a color filter arrangement that is suitable for the CCD image sensing element in FIG. 1.

FIG. 15 is an example of another color filter arrangement that is suitable for the image sensing element 102 in FIG. 1, and is a modified Bayer pattern filter arrangement. In the color filter arrangement in FIG. 15, the G filters are arranged in the same staggered arrangement as in the usual Bayer pattern, and three types of color filters, namely R, B and Mg, are arranged in stripes in the remaining pixels. The signals after four pixels have been mixed with this filter arrangement correspond to 2G+R+B (referred to as G'), 2G+2R+B (referred to as Ye'), and 2G+2B+R (referred to as Cy'). Thus, the G component, which contributes most to the luminance signal, is present in all pixels in the horizontal direction, so that the horizontal resolution can be improved.

It should be noted that Mg in FIG. 15 can be replaced by G. Mg contains an R and a B component, which are not contained by G, so that it is disadvantageous with respect to color resolution during all pixel readout, but it slightly increases the color modulation degree during four-pixel mixing, so that it is advantageous for the color S/N of the moving picture.

Next, a technique for improving the resolution of moving pictures even further is explained. With the offset sampling illustrated in FIGS. 12 and 13, the horizontal resolution can be increased, but the diagonal resolution is not improved. To address the diagonal resolution, the pixel mixing combinations in horizontal direction in the above-described four-pixel mixing is changed for each frame.

FIG. 16A shows the four-pixel mixing in a first frame, and FIG. 16B shows the four-pixel mixing in a second frame.

Here, taking the modified Bayer pattern filter arrangement of FIG. 15 as an example, the combinations of the pixel mixings in the horizontal direction are changed at each frame.

Figure 17:
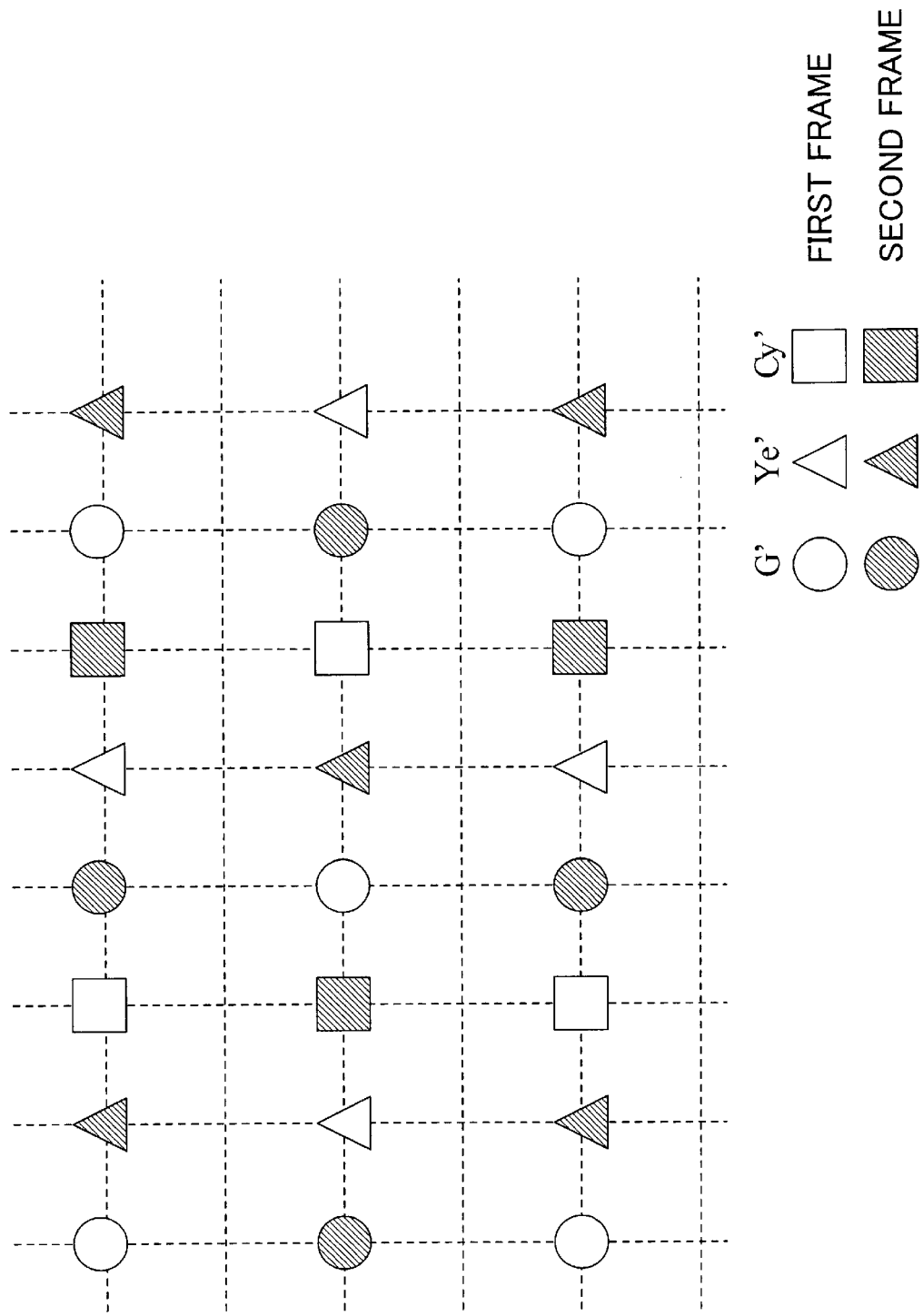
FIG. 17 illustrates how the diagonal resolution is improved by synthesizing the first frame of FIG. 16A and the second frame of FIG. 16B.

FIG. 17 shows how in one horizontal line, twice the number of sampling points can be obtained by combining the first frame of FIG. 16A and the second frame of FIG. 16B, thus improving the diagonal resolution.

Figure 18:
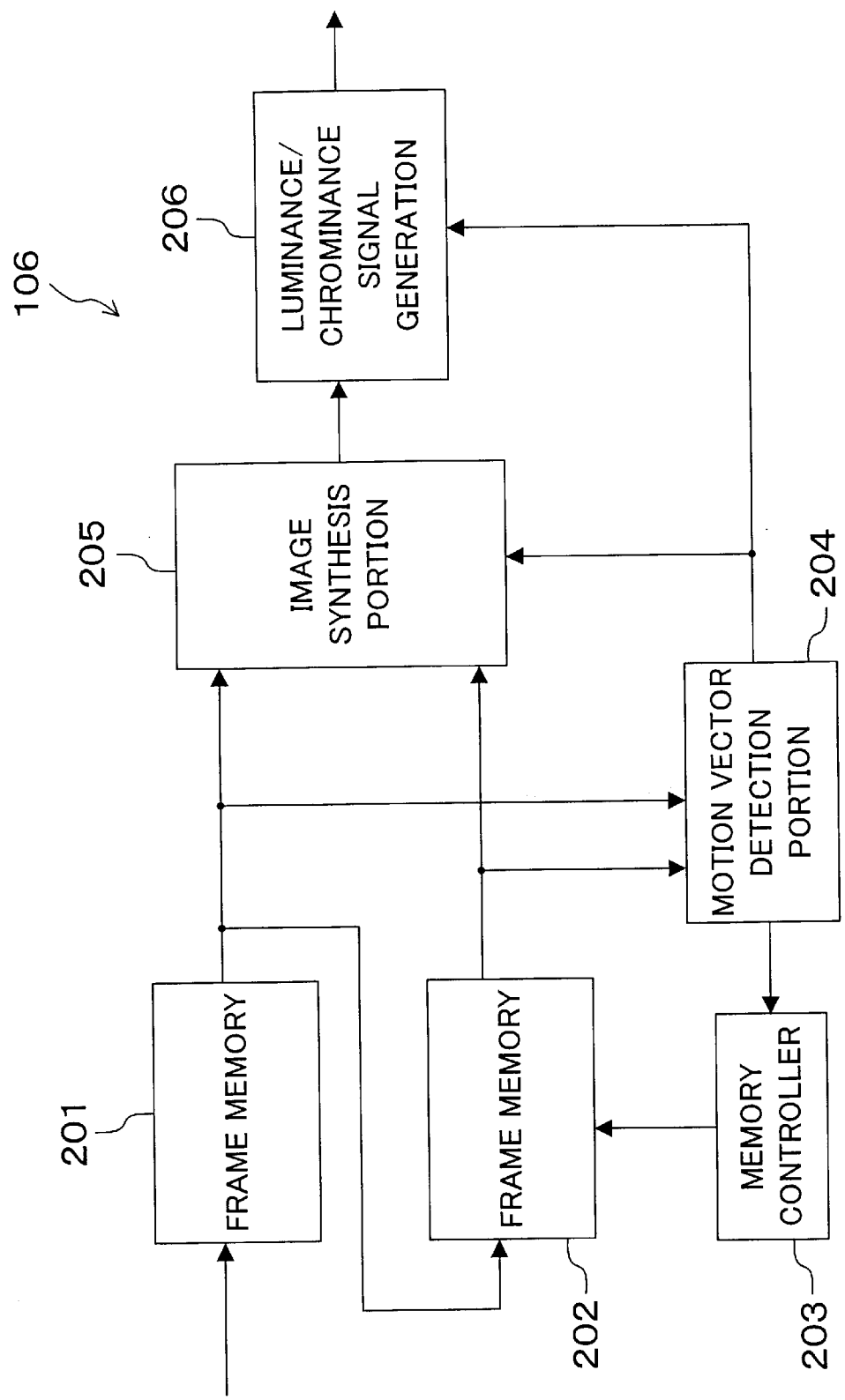
FIG. 18 is a diagram showing an example (frame synthesis with motion compensation) of the configuration of the digital signal processing portion in FIG. 1.

FIG. 18 shows an example of the configuration of the digital signal processing portion 106 in FIG. 1. In FIG. 18, numerals 201 and 202 denote frame memories each storing the image for one frame, numeral 203 denotes a memory controller for controlling the access of the frame memory 202, numeral 204 denotes a motion vector detection portion for detecting a motion vector between the images of two frames, numeral 205 denotes an image synthesis portion synthesizing the images of two frames, and numeral 206 denotes a luminance/chrominance signal generation portion for generating a luminance signal and a chrominance signal from the synthesized image.

The image synthesis portion 205 has the function to synthesize the images of the two frames with different combinations of pixel mixings in the horizontal direction as shown in FIG. 17. However, when there is motion in the image, then the image will become blurred when the images of the two frames are synthesized without further processing. For this reason, motion vectors in the image are detected with the motion vector detection portion 204, and a motion compensation is carried out while combining the frames.

In accordance with FIG. 18, first the image of the first frame and then the image of the second frame is entered, and the image of the first frame is stored in the frame memory 202, whereas the image of the second frame is stored in the frame memory 201. The motion vector detection portion 204 detects motion vectors by the block matching algorithm in predetermined regions. The predetermined regions may be for example square regions of 16×16 pixels. This is also the region size for motion vector detection that is used in the MPEG compression/encoding format for moving pictures, and it is also possible to share the circuitry in image sensing apparatuses provided with an MPEG compression function. Next, based on the detected motion vectors, the memory controller 203 controls the readout addresses of the frame memory 202 to output the image of the first frame that is closest to the same position in the image of the second frame, which is stored in the frame memory 201. The image synthesis portion 205 combines the image of the second frame that is output from the frame memory 201 at a predetermined proportion with the image of the first frame that is output from the frame memory 202. This proportion is determined based on the correlation of the images from the motion vector detection portion 204 and whether the values of the motion vectors are close to the values at which pixel interpolation is effective. For example, when the motion of the image is irrelevant to the interpolation of the sampling points of the colors, then interpolation is not effective so that synthesis is not performed. The luminance/chrominance signal generation portion 206 generates a luminance signal and a chrominance signal from the image synthesized with the image synthesis portion 205. For this, higher image quality can be realized by performing suitable processing, such as setting suitable filter coefficients in accordance with the sampling position in the synthesized image, based on the information from the motion vector detection portion 204.

It should be noted that the present invention can be applied not only to DSCs, but to any image sensing apparatus having a still picture image sensing mode and a moving picture image sensing mode.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image sensing apparatus, comprising:
   an image sensing element having a plurality of photoelectric conversion portions for photoelectric conversion of a subject image, the photoelectric conversion portions being arranged as pixels in horizontal direction and vertical direction; and
   a mixing means for mixing and outputting charges of four pixels of the image sensing element that are adjacent in the horizontal direction and the vertical direction, the four pixels corresponding to at least two kinds of primary colors;
   wherein combinations of the pixel mixings in the horizontal direction are changed at each line, so that the signals after the four pixels have been mixed are in an offset sampling relation for each line.

2. The image sensing apparatus according to claim 1, wherein the combinations of the pixel mixings in the vertical direction are changed for each field.

3. The image sensing apparatus according to claim 1, wherein the mixing means comprises:
   vertical transfer portions for vertically transferring charges of the pixels;
   a horizontal transfer portion for horizontally transferring charges that have been transferred with the vertical transfer portions; and
   a mixing control portion for performing two-pixel mixing in the vertical direction by mixing the charges of two adjacent pixels in the vertical transfer portions, performing two-pixel mixing in the horizontal direction by mixing the charges of two adjacent pixels in the horizontal transfer portion, and as a result performing four-pixel mixing in the horizontal direction and the vertical direction.

4. The image sensing apparatus according to claim 1, wherein the mixing means comprises:
   vertical transfer portions for vertically transferring charges of the pixels;
   a horizontal transfer portion for horizontally transferring charges that have been transferred with the vertical transfer portions; and
   a mixing control portion for performing two-pixel mixing in the vertical direction by performing twice in succession an operation of transferring charges that have been transferred with the vertical transfer portions to the horizontal transfer portion before starting the horizontal transfer, performing two-pixel mixing in the horizontal direction by mixing the charges of two adjacent pixels in the horizontal transfer portion, and as a result performing four-pixel mixing in the horizontal direction and the vertical direction.

5. An image sensing apparatus, comprising:
   an image sensing element having a plurality of photoelectric conversion portions for photoelectric conversion of a subject image, the photoelectric conversion portions being arranged as pixels in horizontal direction and vertical direction;
   a mixing means for mixing and outputting charges of four pixels of the image sensing element that are adjacent in the horizontal direction and the vertical direction, the four pixels corresponding to at least two kinds of primary colors; and
   a control means for selecting and controlling an operation mode in which signals of all pixels are output independently without performing the four-pixel mixing, and an operation mode in which signals after the four pixels have been mixed are output;
   wherein the image sensing element is provided with a color filter arrangement with which in both operation modes at least three independent color signals are obtained.

6. The image sensing apparatus according to claim 5, wherein the color filter arrangement includes at least two kinds of color filters within the areas of four pixels that are mixed.

7. The image sensing apparatus according to claim 5, wherein the color filter arrangement is an RGB primary color stripe arrangement.

8. The image sensing apparatus according to claim 5, wherein the color filter arrangement is an arrangement in which G filters are arranged in a staggered arrangement, and three types of color filters are arranged in stripes in the remaining pixels.

9. An image sensing apparatus, comprising:
   an image sensing element having a plurality of photoelectric conversion portions for photoelectric conversion of a subject image, the photoelectric conversion portions being arranged as pixels in horizontal direction and vertical direction;
   a mixing means for mixing and outputting charges of four pixels of the image sensing element that are adjacent in the horizontal direction and the vertical direction, the four pixels corresponding to at least two kinds of primary colors;
   a control means for changing for each frame the combination of pixel mixings in the horizontal direction in the four-pixel mixing; and
   a pixel synthesis portion for synthesizing an image of two frames with different combinations of pixel mixings in the horizontal direction.

10. The image sensing apparatus according to claim 9, further comprising a motion vector detection portion for detecting a motion vector between the images of two frames with different combinations of pixel mixings in the horizontal direction;
    wherein the image synthesis portion performs pixel interpolation by motion compensation based on the motion vector, while performing image synthesis of the two frames.

11. An image sensing apparatus, comprising:
    an image sensing element having a plurality of photoelectric conversion portions for photoelectric conversion of a subject image and a color filter arrangement including at least two kinds of primary color filters, the photoelectric conversion portions being arranged as pixels in the horizontal direction and vertical direction and each of the pixels corresponds to one of the color filters; and
    a mixing means for mixing and outputting charges of four pixels of the image sensing element that are adjacent in the horizontal direction and the vertical direction; the four pixels corresponding to at least two kinds of primary colors.

* * * * *